United States Patent [19]

Tiao et al.

[11] Patent Number: 4,980,386

[45] Date of Patent: Dec. 25, 1990

[54] METHODS FOR THE MANUFACTURE OF ENERGY-ATTENUATING POLYURETHANES

[75] Inventors: Wen-Yu Tiao; Chin-Sheng Tiao, both of Bethlehem, Pa.

[73] Assignee: Polymer Dynamics Technology, Inc., Allentown, Pa.

[21] Appl. No.: 344,756

[22] Filed: Apr. 28, 1989

[51] Int. Cl.$^5$ .............................................. C08G 18/14
[52] U.S. Cl. .................................. 521/108; 521/126; 521/129; 521/172; 521/174; 528/51; 528/53; 528/58; 528/76; 528/83

[58] Field of Search ............... 521/108, 126, 129, 172, 521/174; 528/51, 53, 58, 76, 83

[56] References Cited

U.S. PATENT DOCUMENTS 4,722,946 2/1988 Hostettler ............................ 528/59

*Primary Examiner*—Maurice J. Welsh
*Attorney, Agent, or Firm*—Richard O. Church

[57] ABSTRACT

A method for the manufacture of shock attenuating, low rebound polyurethanes in which polyols are reacted with polyisocyanates having a functionality of at least 2.3 at an isocyanate index of from about 65 to about 90.

18 Claims, 2 Drawing Sheets

METHODS FOR THE MANUFACTURE OF ENERGY-ATTENUATING POLYURETHANES

BACKGROUND OF THE INVENTION

I. Field of the Invention

This invention relates to polyurethanes and more particularly to novel methods for the manufacture of load distributing, shockattenuating polyurethanes of low rebound resilience and the resulting products.

II. Background of the Related Art

Shock-attenuating polyurethanes have been used in a variety of applications which make use of an unusual combination of physical properties available in these materials. Sometimes referred to as "viscoelastic" materials, the shock-attenuating polyurethanes of this invention are like elastic materials in that, when a stress is relieved, they return to their initial shape and do not take a permanent set. They differ from true elastics, however, in that their return, while substantially complete, is not immediate. Hence the polyurethanes with which this invention is concerned display a low rebound velocity in ball rebound and pendulum impact tests. This suggests that they are well suited for use such as, shock-attenuating bumpers or buffer pads to reduce the effect of impact; noise controllers to prevent acoustic resonance; and vibration dampers to moderate vibration induced wave propagation and oscillation. The polyurethanes of this invention are also well suited to protect the human body and are finding acceptance, for example, as shock absorbing insoles for shoes and protective pads in sports.

Commonly assigned U.S. Pat. No. 4,722,946 claims a shock-attenuating polyurethane made by the process of reacting a mixture of linear and branched polyols, a polyisocyanate, and optionally a blowing agent, under polyurethane forming conditions at an isocyanate index of from about 65 to 85, the teachings of which are incorporated herein by reference.

It has now been found that shock-absorbing polyurethanes, having generally similar properties to those obtained in practicing the '946 patent, can be obtained by using branched polyisocyanates with a functionality of at least 2.3 in combination with a substantially linear polyol rather than a polyisocyanate with a combination of both linear and branched polyols.

OBJECTS OF THE INVENTION

Accordingly, it is an object of this invention to provide novel polyurethanes and methods for their manufacture which attenuate energy, shock, sound and vibration.

Another object of the invention is to provide a method for manufacturing energy-attenuating polyurethane materials which have low rebound resilience, for example, less than 25%, as measured employing the test method defined in ASTM D-2632 "Rubber Property - Resiliency by Vertical Rebound" if the products are dense and ASTM D-3574H "Flexible Cellular Materials - Slab, Bonded and Molded Urethane Foams, Test H, Resilience (Ball Rebound) Test", if the products are foamed.

Another object of this invention is to prepare polyurethanes which have a significant mechanical hysteresis loss.

Yet another object of this invention is to prepare polyurethanes which will substantially fully recover after a deforming stress is relieved, but for which the recovery is not immediate.

SUMMARY OF THE INVENTION

The foregoing and related objects of this invention are provided by the process of reacting a polyol, a polyisocyanate having a functionality of at least 2.3 and optionally a blowing agent in the presence of a catalyst, at an isocyanate index of from about 65 to 90.

In a polyurethane reaction, the isocyanate index may be defined as the ratio of the equivalent weight of isocyanate to the equivalent weight of polyol, water and other reactive hydrogen equivalents. This may be expressed as:

$$\text{Isocyanate Index} = \frac{\text{The Sum of } NCO \text{ Equivalents}}{\text{The Sum of Reactive Hydrogen Equivalents}} \times 100$$

The polyurethanes of this invention are capable of reducing the magnitude of the transmitted or rebounded forces of displacement or acceleration which result from noise, shock, or vibrational energy. The materials of this invention may be used in a wide variety of applications which utilize the different combinations of physical properties available. Such applications include bumpers, sheets and belts for use in the automotive and aircraft industries; vibration isolation pads for use with vibrating machinery; protective tool handles and gloves for use by workers handling air hammers and chippers; heel pads and insoles for use in the footwear industry to moderate the increased risk of degenerative joint disorders and low back pain brought on by the detrimental effects of heel and metatarsal strike induced shock waves; and as body joint protective devices for use in sport applications.

DESCRIPTION OF THE PREFERRED EMBODIMENT

Figure 1:
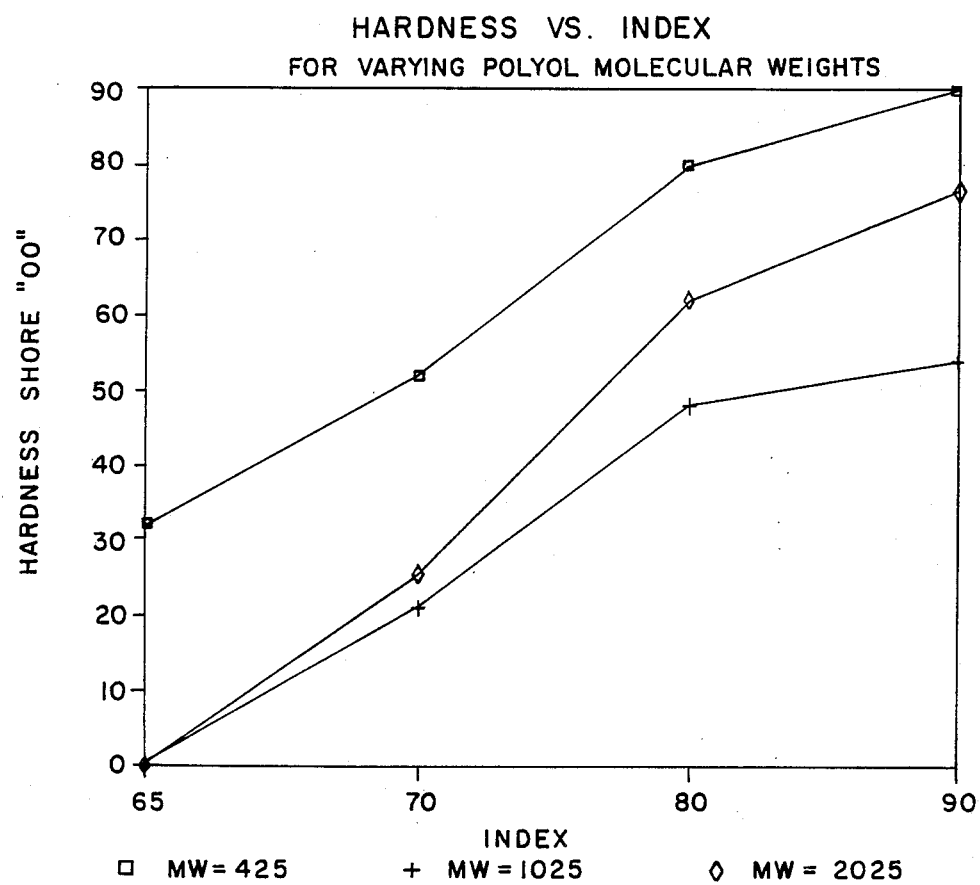
FIG. 1 is a graph showing the relationship between the hardness of a product made by the process of this invention and the isocyanate index for several polyols of varying molecular weights.

Novel polyurethane, energy attenuating elastomer and foam products have surprisingly been formulated by reacting a polyol, a branched or poly-isocyanate and a catalyst under polyurethane forming conditions at an isocyanate index of from about 70 to 90. Optionally extenders, surfactants, stabilizers, blowing agents, and the like may be added to control the chemical reaction or enhance the properties of the urethane.

The polyol reaction component of the present invention is predominantly a linear structure with hydroxyl end groups. Polyols found to be particularly useful are polyether polyol and graft polyether polyols containing copolymerized styrene and acrylonitrile, polyester polyols and hydroxyl-containing polybutadienes. Most preferably are polyether polyols containing 2 secondary hydroxyl groups and no primary hydroxyl groups, having a molecular weight of from about 400 to about 2000, and more preferably from about 400 to 1000. The hydroxyl number of the linear polyol reaction component is preferably, from about 55 to about 260, or higher resulting in polyols with equivalent weights of from about 215 to 1000.

The isocyanates that are suitable for the reactions of this invention include aliphatic, cycloaliphatic, arylaliphatic, aromatic and heterocyclic polyisocyanates. Particularly useful isocyanates include polymeric isocyanates made from the classical reaction of carbonylchloride with an aniline-formaldehyde condensate. Still more preferable are polymeric isocyanates such as low viscosity polymethylene polyisocyanates.

In the preparation of the energy-attenuating elastomer and foam products of the present invention, any of the aforementioned polyols can be reacted with any of the isocyanates set forth, in addition to one or more catalysts and other additives.

Functional catalysts for producing polyurethanes in accordance with this invention include tertiary amines, tertiary phosphines, strong bases, acidic metal salts, and organometallic derivatives of tetravalent tin. The catalysts or combinations thereof, are employed in small amounts of, for example, from about 0.01 percent to about 2 percent or more, based on the weight of the reaction mixtures.

Other additives which are within the scope of this invention include fillers, plasticizers, surfactants, pigments, blowing agents, stabilizers, fragrances, and the like.

In creating energy-attenuating polyurethane foam products, in addition to water, a chemical, carbon dioxide producing blowing agent may be employed, such as, for example, trichlorofluoromethane, methylene chloride, low boiling hydrocarbons, and the like.

Particularly effective in the manufacture of foams are surface active agents and foam stabilizers. Suitable surface agents include polyether siloxanes, particularly water soluble block copolymers of siloxanes and polyethers.

The use and proper selection of a surfactant or surface active agent aids in controlling the cell size and effects the physical properties of the finished foam product.

Stabilizers such as antioxidants, antimicrobials, and UV stabilizers are also useful additives in the manufacture of the energy-attenuating polyurethane products of the present invention. In order to stabilize polyurethanes against thermooxidation as well as photodegradation, the most commonly used stabilizers may be classified as radical chain terminators, peroxide decomposers, and UV stabilizers. Stabilizers are generally added in low concentrations (<1%) to inhibit or retard the progress of thermooxidative or UV initiated degradation. Radical chain terminators possess labile hydrogen atoms that are more reactive towards peroxy radicals than hydrogen atoms attached to the polymer. The free radicals formed from the stabilizers are relatively stable and do not participate in the chain propagation reactions. The radical chain terminators mainly consist of phenols and secondary amines. The principal types of peroxide decomposers are phosphites and various types of surface compounds. The UV stabilizers engage in an energy transfer process by absorbing the incident radiation and gradually dissipating the accumulated energy in a manner which does not adversely affect the polymer composition. The use of two or more stabilizers is after preferred. Generally, the most effective synergistic mixture of stabilizers are those in which one compound functions as a peroxide decomposer and the other as an acceptor of free radicals.

EXAMPLES

In examples 1–15 which follow, the same general procedure for preparing polyurethanes was employed. The polyol blend employed in the examples which follow were degassed at 90°–95° C. under a vacuum (5 mm Hg) for several hours to remove air and moisture. Thus, the blend of polyol, catalysts, antifoam agents and the like was premixed followed by degassing at room temperature to eliminate all the dissolved air. After adding the isocyanate thereto, the reactants were mixed, quickly degassed and the material was poured into an open mold which had been preheated to approximately 50°–55° C. The samples were allowed to cure at 50°–55° C. for between 15 and 20 minutes. Samples which were prepared for physical property testing were demolded and allowed to postcure for three to five days at ambient temperature in accordance with ASTM methods heretofore outlined in the disclosure.

Example 16 was prepared in accordance with polyurethane foaming reaction techniques well known in the art.

In the examples which follow, the components of the polyurethane elastomers and foams are as follows:

NIAX Polyol PPG 425 (Union Carbide Corporation): A polypropylene glycol (diol) with a molecular weight of 425 and a hydroxyl number of 263.

NIAX Polyol PPG 1025 (Union Carbide Corporation): A polypropylene glycol (diol) with a molecular weight of 1025 and a hydroxyl number of 111.

NIAX Polyol PPG 2025 (Union Carbide Corporation): A polypropylene glycol (diol) with a molecular weight of 2025 and a hydroxyl number of 56.

1,4 Butanediol (BASF): Also known as 1,4 butylene glycol. This chemical is formed by high-pressure synthesis of acetylene and formaldehyde. It is a colorless, oily liquid with a specific gravity of 1.03.

PAPI 27 (Dow Chemical Corporation): A polymeric diphenylmethane diisocyanate product produced by the reaction of carbonylchloride with an aniline-formaldehyde condensate. It has a functionality of 2.7, an amine equivalent of 129–134 grams/NCO, and an NCO % of 31.3 to 32.6%. It has a viscosity at 25° C. of 40–60 cps.

PAPI 94 (Dow Chemical Corporation): A polymeric MDI product derived from the reaction of carbonylchloride with an aniline-formaldehyde condensate. It has a functionality of 2.3, an isocyanate equivalent of 131 and an NCO % of 32% by weight.

Dabco 33LV (Air Products and Chemicals, Inc.): A tertiary amine catalyst containing 33.3% triethylenediamine and 66.6% dipropylene glycol.

Dabco 131 (Air Products and Chemicals): An organotin gelation catalyst with a total tin content of 17.5%; a Brookfield viscosity of 33 cps; and a specific gravity of 1.11.

Dabco HB (Air Products and Chemicals, Inc.): Catalyst blend of tertiary amines and butanediol with a specific gravity of 1.033 at 23° C. and a freezing point of −76° F.

NIAX Catalyst A-1 (Union Carbide Corporation): Contains 70% bis(2-dimethylaminoethyl) ether and 30% dipropylene glycol.

L-5420 (Union Carbide Corporation): A non-hydrolyzable surfactant composed of polyalkyleneoxidemethylsiloxane copolymer with available OH groups which allow L-5420 to chemically react into the polymer system.

L-5340 (Union Carbide Corporation): A non-hydrolyzable silicone surfactant composed of polyalkyleneoxidemethylsiloxane copolymer.

Antifoam 1500 (Dow Corning Corporation): 100% silica-filled polydimethylsiloxane with a viscosity of 1200 cps at 25° C.

DC-200/30,000 (Dow Corning Corporation): Dow Corning 200 fluid is a dimethyl siloxane polymer with viscosities ranging from 0.65 to 100,000 centistokes. This silicone fluid has a viscosity of 30,000 centistokes.

COMPARATIVE EXAMPLES 1–12

In the following examples, a mixture of a linear polyol, several catalysts and an antifoam agent were reacted with a branched isocyanate and evaluated in accordance with ASTM standards for hardness and ball rebound resilience.

The isocyanate index was varied from 65 to 90. Higher indexes resulted in harder energy-attenuating elastomers than did the lower indexes. Ball rebound resilience was also found to increase with increasing isocyanate index, (FIGS. 1 and 2).

Figure 2:
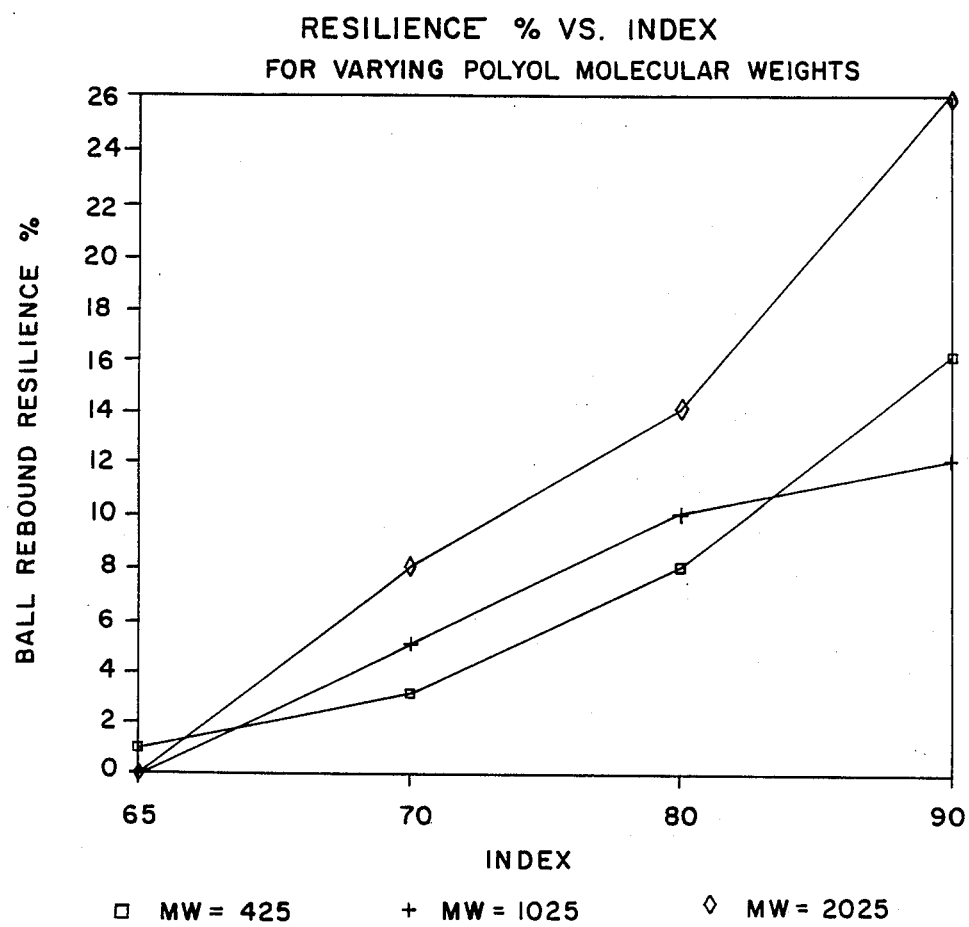
FIG. 2 is a graph showing the relationship between the ball rebound resilience of a product made by the process of this invention and the isocyanate index for several polyols of varying molecular weights.

Thus, as illustrated in FIG. 1 and FIG. 2, both hardness and resiliency increase with increasing molecular weights and, to this extent, an index should be selected that best approximates the desired properties. It must be understood it is difficult to obtain both a high degree of hardness and low resiliency so that a compromise generally must be accepted.

It was observed that the hardness of the products ranged from a low of about 20 Shore "OO" to a high of about 90 Shore "OO" when the aforementioned isocyanate indexes were employed. The ball rebound resilience of the energy-attenuating elastomer products varied from 1% at low isocyanate indexes to between 11% and 26% for high isocyanate indexes. It should be noted that the low molecular weight polyol had a much lower rebound resilience at all indexes than the high molecular weight polyol.

In essence, choosing the proper molecular weight polyol and the correct isocyanate index are quite important in obtaining products with good energy-attenuating capabilities.

TABLE I

EFFECT OF POLYOL MOLECULAR WEIGHT AND ISOCYANATE INDEX ON BALL REBOUND RESILIENCE

| EXAMPLE | 1 | 2 | 3 | 4 | 5 | 6 |
|---|---|---|---|---|---|---|
| NIAX POLYOL PPG-424 | 100 | 100 | 100 | 100 | — | — |
| NIAX POLYOL PPG-1025 | — | — | — | — | 100 | 100 |
| NIAX POLYOL PPG-2025 | — | — | — | — | — | — |
| DABCO 33-LV | 1.0 | 1.0 | 1.0 | 1.0 | 1.0 | 1.0 |
| DABCO 131 | 0.01 | 0.01 | 0.01 | 0.01 | 0.01 | 0.01 |
| ANTIFOAM 1500 | 0.2 | 0.2 | 0.2 | 0.2 | 0.2 | 0.2 |
| PAPI 27 INDEX | 90 | 80 | 70 | 65 | 90 | 80 |
| HARDNESS (SHORE OO) | 90 | 80 | 52 | 32 | 54 | 48 |
| BALL REBOUND RESILIENCE (%) | 16 | 8 | 3 | 1 | 12 | 10 |
| DENSITY (g/cc) | 1.0 | 1.0 | 1.0 | 1.0 | 1.0 | 1.0 |
| EXAMPLE | 7 | 8 | 9 | 10 | 11 | 12 |
| NIAX POLYOL PPG-425 | — | — | — | — | — | — |
| NIAX POLYOL PPG-1025 | 100 | 100 | — | — | — | — |
| NIAX POLYOL PPG-2025 | — | — | 100 | 100 | 100 | 100 |
| DABCO 33-LV | 1.0 | 1.0 | 1.0 | 1.0 | 1.0 | 1.0 |
| DABCO 131 | 0.01 | 0.01 | 0.01 | 0.01 | 0.01 | 0.01 |
| ANTIFOAM 1500 | 0.2 | 0.2 | 0.2 | 0.2 | 0.2 | 0.2 |
| PAPI 27 INDEX | 70 | 65 | 90 | 80 | 70 | 65 |
| HARDNESS (SHORE OO) | 21 | — | 77 | 62 | 25 | — |
| BALL REBOUND RESILIENCE (%) | 5 | — | 26 | 14 | 8 | — |
| DENSITY (g/cc) | 1.0 | — | 1.0 | 1.0 | 1.0 | — |

COMPARATIVE EXAMPLES 13–15

In the following examples, all of the conditions were the same except that polyisocyanates of differing functionality were used to demonstrate the effect the functionality of the isocyanates had on the hardness and resiliency of the resulting polyurethane. The values for reactants are given in parts by weight.

TABLE II

| Example | 13 | 14 | 15 |
|---|---|---|---|
| NIAX Polyol PPG-425 | 100.0 | 100.0 | 100.0 |
| Dabco 33-LV | 1.0 | 1.0 | 1.0 |
| Dabco 131 | 0.01 | 0.01 | 0.01 |
| Antifoam 1500 | 0.2 | 0.2 | 0.2 |
| PAPI 94 (f = 2.3) | 50.3 | 51.4 | 54.1 |
| 27 (f = 2.7) | | | |
| 20 (f = 3.2) | | | |
| Index | 80 | 80 | 80 |
| Hardness (Shore OO) | 59 | 80 | 87 |
| Ball Rebound (%) | 6 | 8 | 8 |

From these examples it can be seen that the hardness of the polyurethane can be significantly increased by increasing the functionality of the polyisocyanate without a corresponding material increase in the ball bounce resilience of the polyurethane.

EXAMPLES 16

These examples illustrate the composition used to make an energy-attenuating foam product according to the conventional one-shot, free-rise method. In the preparation of foam products, proper selection of catalysts and surfactants is important in order to obtain foams with adequate cell size and ultimate foam physical properties. The foam cell opening is controlled to prevent shrinkage of the foam.

TABLE III

| EXAMPLE | 16 |
|---|---|
| NIAX POLYOL PPG-1025 | 100 |
| WATER | 1.6 |
| NIAX CATALYST A-1 | 0.1 |
| DABCO HB | 1.0 |
| 1,4 BUTANEDIOL | 8.0 |
| L-5340 | 1.0 |
| L-5420 | 1.0 |
| DC 200 (30,000) | 0.6 |
| DABCO 131 (10%) | 0.14 |
| PAPI 94 | 63.5 |
| INDEX | 85 |
| CREAH TIME (SEC) | 13–15 |
| RISE TIME (SEC) | 55–60 |
| OPEN CELLED SLAB FOAM | |
| DENSITY (g/cc) | 0.072 |
| HARDNESS "000" | 25 |
| BALL REBOUND | 6–8 |

TABLE III-continued

| EXAMPLE | 16 |
| --- | --- |
| RESILIENCE (%) | |

We claim:

1. A process for the manufacture of a non-liquid, energy-attenuating polyurethane having low elastic recovery and low rebound resiliency, resulting from the reaction of linear polyols with branched polyisocyanates under polyurethane forming conditions.

2. The process according to claim 1 in which the polyurethane forming conditions include the use of a catalyst selected from the group consisting of aliphatic and aromatic tertiary amines, tertiary phosphines, strong bases, acidic metal salts of strong acids, and organo metallic compounds.

3. The process according to claim 1 wherein the polyol has a molecular weight of between 400 to about 2000, an equivalent weight of between 215 and 1000, and possesses 2 secondary hydroxyl groups and no primary hydroxyl groups.

4. The process according to claim 3 wherein the polyisocyanate has a functionality of at least 2.3.

5. The process according to claim 4 wherein the isocyanate index is from about 65 to about 90.

6. A polyurethane made in accordance with claim 5.

7. The polyurethane of claim 6 possessing a Shore "OO" hardness according to ASTM D-2240 of between 20 to about 90 Shore "OO" for unfoamed polyurethanes and between 25 Shore "OOO" to about 60 Shore "OO" for foamed polyurethanes.

8. The polyurethane of claim 6 possessing a ball rebound resilience according to ASTM D-2632 of between 1 to about 26% for unfoamed polyurethanes and a ball rebound resilience according to ASTM D-3574H of between 5 to about 15% for foamed polyurethanes.

9. An article fabricated from the polyurethane of claim 6.

10. The article of claim 9 in which the article is an energy-attenuation device.

11. The article of claim 10 in which the device is a body protecting device.

12. The article according to claim 11 in which the device is incorporated into a glove.

13. The article according to claim 11 in which the device is incorporated into a helmet.

14. The article according to claim 11 in which the device is incorporated into a shoe.

15. The process according to claim 5 containing at least one additive selected from the group consisting of filler, pigment, surfactant, plasticizer and where said polyurethane is a foam, a foam stabilizer.

16. A method for the manufacture of a solid shock-attenuating polyurethane in which a polyol is reacted with a polyisocyanate under polyurethane forming conditions using known catalytic agents for the reaction, the improvement comprising the use of a polyisocyanate having a functionality of at least 2.3 at an isocyanate index of from about 65 to about 90.

17. A method according to claim 11 in which the polyol has a molecular weight of between about 400 and 2000, an equivalent weight of between about 215 and 1000, and 2 secondary hydroxyl groups.

18. A polyurethane made in accordance with the method of claim 16.

* * * * *